United States Patent [19]
Pischke et al.

[11] Patent Number: 5,184,841
[45] Date of Patent: Feb. 9, 1993

[54] HEIGHT REGULATING SYSTEM FOR A VEHICLE WITH AIR SUSPENSION

[75] Inventors: Jürgen Pischke, Weissach; Engelbert Tillhon, Lauffen, both of Fed. Rep. of Germany

[73] Assignee: Robert Bosch CmbH, Stuttgart, Fed. Rep. of Germany

[21] Appl. No.: 585,164
[22] PCT Filed: Apr. 14, 1988
[86] PCT No.: PCT/EP88/00316
§ 371 Date: Oct. 15, 1989
§ 102(e) Date: Oct. 15, 1989
[87] PCT Pub. No.: WO89/09704
PCT Pub. Date: Oct. 19, 1989
[51] Int. Cl.$^5$ .......................... B60G 17/015
[52] U.S. Cl. .................... 280/707; 280/711; 280/612
[58] Field of Search ............ 280/707, 840, DIG. 1, 280/711, 6.12

[56] References Cited
U.S. PATENT DOCUMENTS
4,518,169 5/1985 Kuroki et al. .............. 280/840
4,610,462 9/1986 Kumagai ................... 280/707
FOREIGN PATENT DOCUMENTS
60-209312 10/1985 Japan ........................ 280/707
60-209314 10/1985 Japan ........................ 280/707
61-57416 3/1986 Japan ........................ 280/707
60-244611 10/1986 Japan ........................ 280/707
61-268508 11/1986 Japan ........................ 280/707

OTHER PUBLICATIONS
Patent Abstracts of Japan, vol. 10, No. 62 (M-460) (2119) dated Mar. 12, 1986 JP-A-60 209 312.

Primary Examiner—Karin L. Tyson
Attorney, Agent, or Firm—Walter Ottesen

[57] ABSTRACT

In a height regulation system for a vehicle having an air spring suspension, the actual value (h) of the height of the vehicle body (10) is filtered with a short time constant ($t_1$) to produce a first signal ($NIV_1$) which is compared with a desired height ($h_o$). The actual value (h) is also filtered with a longer time constant ($t_2$) to produce a second (delayed) signal ($NIV_2$) which can be compared with the desired value ($h_o$). The selection of the first signal ($NIV_1$) or the second signal ($NIV_2$) is effected by an electronic switch (46) under the control of a velocity comparator (50). When the vehicle is at rest or moving at a relatively slow speed (below $v_o$) at which large oscillations are not expected, the filter (40) with the shorter time constant ($t_1$) is connected to the comparator (48) for comparison with the desired height ($h_o$) whereas, at higher velocities ($v > v_o$) the second filter (42) with the longer time constant ($t_2$) is brought into use.

3 Claims, 1 Drawing Sheet

HEIGHT REGULATING SYSTEM FOR A VEHICLE WITH AIR SUSPENSION

FIELD OF THE INVENTION

The present invention relates to a height regulating system for a vehicle having air suspension. In this system, the actual height of the vehicle body is measured with a sensor disposed between the vehicle body and an axle. The actual height is compared to a desired height to produce a correction signal and a control device controls the input or release of compressed air to or from an air spring according to the correction signal until the actual height substantially equals the desired height.

BACKGROUND OF THE INVENTION

Such a system is known from U.S. Pat. No. 4,518,169 wherein compressed air is admitted to the air spring when a distance sensor senses that the height of the vehicle body is below a desired value and air is released from the air spring when the distance sensor senses that the body height is above the desired value. It has been proposed to smooth the height signals h in a filter with a relatively short time constant in order to remove high frequency signal components.

To avoid adjustment in response to transient fluctuations of body height relative to the axle, as may be occasioned by a rough road surface or on encountering a pothole, it has been further proposed to filter with a larger time constant the correction signals in the control computer itself by virtue of the software in the control computer. This has the disadvantage that there is a phase delay between a deviation in the height signal h and the onset of the correcting height regulation operation. In order to be able to regulate the height of the vehicle body with reasonable certainty, a suitable compromise would be chosen, that is, the time constant of the software filter is chosen to be shorter than that which would eliminate virtually all response to transient variations in the body height.

SUMMARY OF THE INVENTION

An object of the invention is to enable the time constant effective at any given time to be adapted to the travelling conditions, such as the velocity of the vehicle.

The invention affords the advantage that a smaller value can be chosen for the time constant ($t_1$) of the first filter, whereby rapid response to adjustment of the desired height can be obtained while the longer time constant ($t_2$) of the second filter prevents repeated regulating operations in the event of transient fluctuations in the body height (h) when travelling at an appreciable velocity.

BRIEF DESCRIPTION OF THE DRAWINGS

The invention is further described, by way of example, with reference to the accompanying drawings, in which.

DESCRIPTION OF THE PREFERRED EMBODIMENTS OF THE INVENTION

Figure 1:
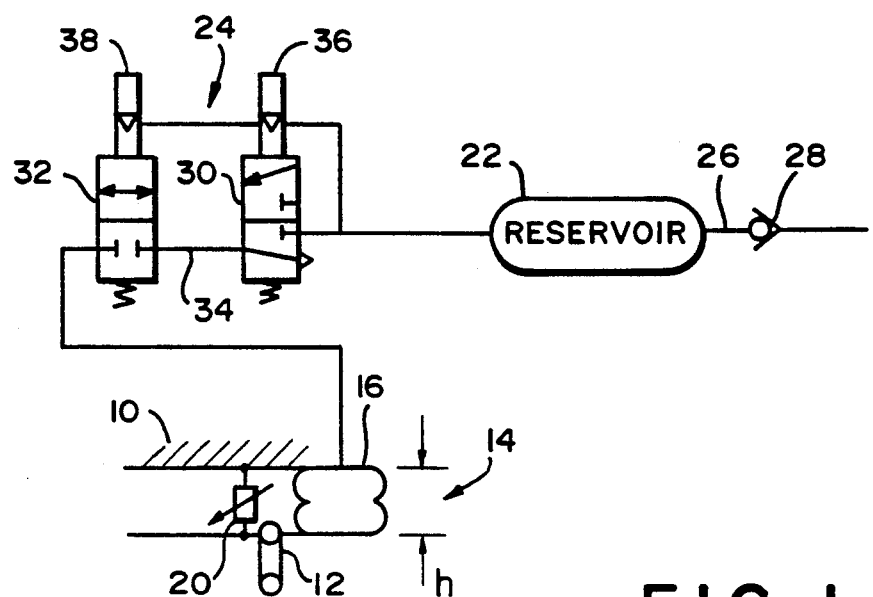
FIG. 1 is a diagram of an air suspension system for a vehicle fitted with a height regulating system.

FIG. 1 shows diagrammatically a part of a vehicle body 10 attached to an axle 12 by an air suspension 14. The air suspension 14 comprises an air spring bellows 16 and a height measuring sensor 20, each arranged between the vehicle body 10 and the axle 12. The height measuring sensor 20 can be a simple potentiometer or variable resistor or an inductive transducer. The air spring bellows 16 is filled and emptied as required by a compressed air reservoir 22 and a solenoid valve arrangement 24. The reservoir 22 is charged from a compressor (not shown) via a line 26 containing a non-return valve 28. The valve arrangement 24 comprises a 3-port, 2-position valve 30 and a 2-port, 2-position valve 32 in a line 34 between the reservoir 22 and the suspension bellows 16. The valves are spring-biased to their positions shown and are operated by solenoids 36, 38 with the assistance of air pressure from the reservoir 22. Actuation of both valves 30, 32 connects the air spring bellows 16 to the reservoir 22 in order to feed compressed air to the air suspension 14 and thereby increase the height h of the vehicle body 10 relative to the axle 12. Actuation of the valve 32 alone connects the air spring bellows 16 via the unactuated valve 30 to exhaust and thereby decrease the height h of the vehicle 10.

Figure 2:
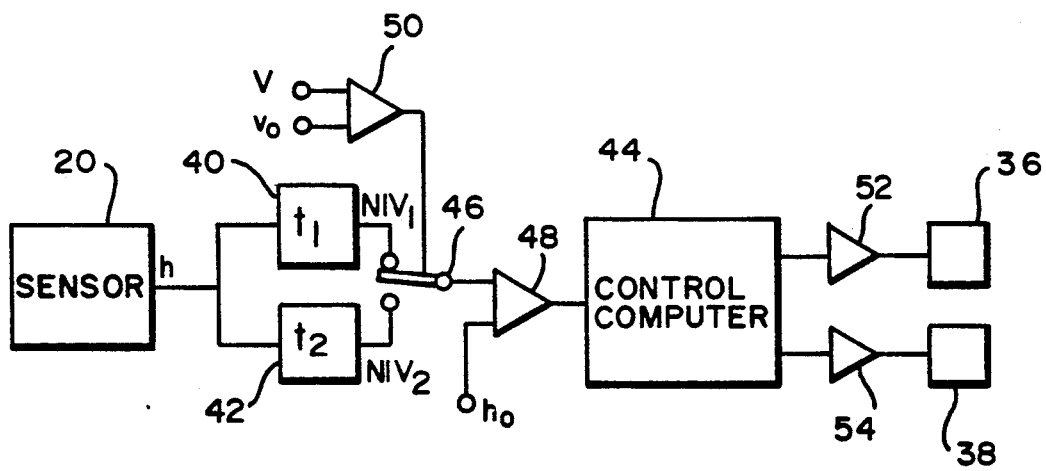
FIG. 2 is a block diagram of the height regulating system according to the invention.

Referring now to FIG. 2, the output h of the sensor 20 is processed in filters 40 and 42 to produce smoothed signals $NIV_1$ and $NIV_2$ respectively. The time constants $t_1$ and $t_2$ of the filters 40 and 42 are such that $t_2 > t_1$.

The smoothed signal $NIV_1$ or $NIV_2$ is applied via an electronic switch 46 to a comparator 48 for comparison with a desired height $h_0$. The output of the comparator 48 is fed to a control computer 44 which operates the valve solenoids 36, 38 via respective amplifier end stages 52, 54.

The electronic switch 46 is actuated by a velocity comparator 50 which compares the vehicle velocity v with a relatively low threshold velocity $v_0$ (e.g., 6 km/h).

When the vehicle is at rest $v < v_0$, the electronic switch 46 is in its position shown, whereby the height regulation is conducted by the control device 44 in accordance with the measured height h as smoothed by the first filter 40 with the relatively short time constant $t_1$ (e.g. below 1 sec and greater than approximately 200 msec) to obtain a response with as short a phase displacement as possible. Under such conditions, large oscillations of the vehicle body 10 are not to be expected. As soon as the vehicle velocity v exceeds the reference value $v_0$, the switch 46 is changed over and the height regulation is carried out using the measured height h as smoothed by the second filter 42 with the longer time constant $t_2$. This increases the phase displacement or phase delay of the response to changes in the body height h but this is not so disadvantageous as such changes are likely to be infrequent.

The switch 46 could be placed in front of the filters 40, 42 instead of after them, as shown. Another possibility would be to connect separate comparators directly to the two filters 40, 42 and to connect the outputs of such comparators to the electronic switch. The latter could be incorporated in the control computer 44.

We claim:

1. A height regulating system for a vehicle travelling at a road velocity (v), the vehicle having a vehicle body and an air spring suspension, the system comprising:

sensor means for measuring the actual height (h) of the vehicle body and producing a first height signal indicative of said actual height (h), said sensor means being disposed between the vehicle body and an axle of the vehicle;

first filter means having a first time constant ($t_1$) for filtering said first height signal to produce a first smoothed signal;

second filter means for filtering said first height signal to produce a second smoothed signal, said second filter means having a time constant ($t_2$) greater than said first time constant ($t_1$);

first comparison means for comparing said actual road velocity (v) to a threshold road velocity ($v_0$) and for issuing a switching signal when said road velocity exceeds or drops below said threshold road velocity ($v_0$);

second comparison means for comparing said first smoothed signal with a second height signal indicative of a desired height ($h_0$) of the vehicle body to produce a first correction signal and for comparing said second smoothed signal with said second height signal to produce a second correction signal;

control means for controlling the admission and release of air to and from the air spring suspension in correspondence to one of said corrective signals; and, switch means operable in response to said switching signal for applying one of said corrective signals to said control means in dependence upon said road velocity (v) of the vehicle.

2. The height regulating system of claim 1, wherein said switch means connects said first filter means to said control means when the vehicle is at rest.

3. The height regulating system of claim 1, wherein said switch means being connected between said first filter means and said second comparison means when the vehicle velocity (v) is below a predetermined value ($v_0$) and being connected between said second filter means and said second comparison means when the vehicle velocity is above said predetermined value ($v_0$).

* * * * *

UNITED STATES PATENT AND TRADEMARK OFFICE
CERTIFICATE OF CORRECTION

PATENT NO. : 5,184,841

DATED : February 9, 1993

INVENTOR(S) : Jürgen Pischke and Engelbert Tillhon

It is certified that error appears in the above-identified patent and that said Letters Patent is hereby corrected as shown below:

On the title page, under "Assignee": delete "Robert Bosch CmbH" and substitute -- Robert Bosch GmbH -- therefor.

On the title page, item [86], line 2: delete "§ 371 Date: Oct. 15, 1989" and substitute therefor -- § 371 Date: Oct. 15, 1990 --.

On the title page, item [86], line 3: delete "§ 102(e) Date: Oct. 15, 1989" and substitute therefor -- § 102(e) Date: Oct. 15, 1990 --.

In column 2, line 42: between "rest" and "$v < v_0$", insert -- or --.

Signed and Sealed this

Twenty-ninth Day of March, 1994

*Attest:*

BRUCE LEHMAN

*Attesting Officer*   *Commissioner of Patents and Trademarks*